United States Patent
Barth et al.

(10) Patent No.: US 10,899,015 B2
(45) Date of Patent: Jan. 26, 2021

(54) METHOD AND SYSTEM FOR DYNAMIC ROBOT POSITIONING

(71) Applicant: SIEMENS AKTIENGESELLSCHAFT, Munich (DE)

(72) Inventors: Thomas Barth, Gottmadingen (DE); Oliver Schulze, Ueberlingen (DE)

(73) Assignee: Siemens Aktiengesellschaft, Munich (DE)

(*) Notice: Subject to any disclaimer, the term of this patent is extended or adjusted under 35 U.S.C. 154(b) by 315 days.

(21) Appl. No.: 16/120,625

(22) Filed: Sep. 4, 2018

(65) Prior Publication Data

US 2019/0070733 A1    Mar. 7, 2019

Related U.S. Application Data

(60) Provisional application No. 62/553,516, filed on Sep. 1, 2017.

(51) Int. Cl.

| G05B 15/00 | (2006.01) |
|---|---|
| G05B 19/00 | (2006.01) |
| B25J 9/16 | (2006.01) |
| G05D 1/02 | (2020.01) |
| B65G 1/04 | (2006.01) |

(52) U.S. Cl.
CPC .......... B25J 9/1697 (2013.01); G05D 1/0246 (2013.01); *B65G 1/0421* (2013.01); *G05D 2201/0216* (2013.01)

(58) Field of Classification Search
CPC ..... B25J 9/1664; B25J 9/1697; B65G 1/0421; G05B 2219/40504; G05D 1/0246; G05D 2201/0216

See application file for complete search history.

(56) References Cited

U.S. PATENT DOCUMENTS

| 2004/0086364 A1* | 5/2004 | Watanabe | B25J 19/021 414/416.01 |
|---|---|---|---|
| 2007/0276540 A1* | 11/2007 | Okuda | G05D 1/028 700/245 |
| 2012/0152877 A1* | 6/2012 | Tadayon | B25J 5/005 212/224 |
| 2016/0339587 A1* | 11/2016 | Rublee | B25J 13/089 |
| 2017/0032311 A1* | 2/2017 | Rizzolo | G06K 9/183 |
| 2017/0225891 A1* | 8/2017 | Elazary | B65G 1/1375 |

* cited by examiner

*Primary Examiner* — Harry Y Oh
(74) *Attorney, Agent, or Firm* — Laurence Greenberg; Werner Stemer; Ralph Locher

(57) ABSTRACT

A method and a system for the exact positioning an autonomous robot device relative to a stationary structure, such as a DBCS robot in a delivery bin and sorting facility. The robot device is driven from a starting position towards a target position. An absolute positioning sensor is used to monitor the approach to towards an assumed absolute position of the target. Once the target position has entered the field of view of a vision sensor mounted to the robot device, the vision sensor takes an instantaneous image of a visual marker at the target position. The image is evaluated to determine a deviation of an actual location of the target position from the assumed target position. The latter is corrected by adding the deviation to the assumed target position. The robot device then continues and is stopped exactly at the corrected target position.

12 Claims, 5 Drawing Sheets

METHOD AND SYSTEM FOR DYNAMIC ROBOT POSITIONING

CROSS-REFERENCE TO RELATED APPLICATION

This application claims the benefit, under 35 U.S.C. § 119(e), of provisional patent application No. 62/553,516, filed Sep. 1, 2017. The prior application is herewith incorporated by reference in its entirety.

BACKGROUND OF THE INVENTION

Field of the Invention

The invention lies in the field of robot control and partially robotic delivery, shipping and sorting systems.

Automation has recently accelerated in warehousing, sorting and shipping systems. Robots are increasingly used for storage positioning and retrieving items in large warehouse systems. It is thereby imperative that sorting containers, storage containers and shipping containers be exactly placed at, and retrieved from, exact positions.

It is thereby necessary to effect millimeter-precision positioning of a shipping container in front of a shelf compartment by heavy equipment robots. The robot may weigh a ton or more and its exact, and quick placement relative to the storage and retrieval bin is rather difficult. Also, the positions of the bins or shelf compartments may change as a result of temperature differences, for example. If the shipping container is not positioned exactly in front of the shelf compartment, the robot may push it into the shelf compartment and thus displace the shelf and/or damage the load, or collide with the shelf. Although precise positioning is already possible, it is very time consuming.

The prior art approach is to utilize two-step positioning. First, coarse positioning is performed. The robot moves the shipping container at high speed to a firmly referenced coarse position. The coarse position is close to the correct final position. The firmly referenced coarse position is stipulated by a firmly set coordinate system. After the robot has stopped, a sensor ascertains the actual position (fine position) of the shelf compartment. The fine position is marked by means of a position marker (e.g. QR code). Once the discrepancy between the coarse position and the fine position has been determined, the robot moves slowly from the coarse position to the fine position. The millimeter-precision positioning is hampered and rendered quite difficult by the considerable weight (approximately one ton) of the robot.

SUMMARY OF THE INVENTION

It is accordingly an object of the invention to provide a process for dynamic robot positioning which overcomes the above-mentioned and other disadvantages of the heretofore-known devices and methods of this general type and which renders the positioning system more agile and quick. It is also an object to provide for a learning and teaching process that renders initiation of the system easy and quick. Finally, it is an object to provide for a robot that includes the novel process and a system that incorporates the novel positioning system.

With the foregoing and other objects in view there is provided, in accordance with the invention, a method of positioning an autonomous robot device relative to a stationary structure. The method comprises:

driving the robot device from a starting position towards a target position at the stationary structure and thereby using an absolute positioning sensor to continuously monitor a position of the robot device relative to the stationary structure;

upon determining that the target position has entered a field of view of a vision sensor mounted to the robot device, causing the vision sensor to take an instantaneous image of a visual marker disposed at the target position;

evaluating the instantaneous image and determining therefrom a deviation of an actual location of the target position from an assumed absolute target position;

correcting the assumed absolute target position by adding the deviation to the stored target position to define a corrected target position; and continuing to drive the robot device to the corrected target position and to stop the robot device at the corrected target position.

In a preferred embodiment of the invention, the robot forms part of a DBCS machine in a delivery bin or sorting bin in a sorting installation.

In other words, the sensor of the robot captures a relatively large area. While the coarse position is being approached, the sensor captures the position marker of the fine position. While the robot is still moving, a computer unit calculates the level at which a deceleration of the robot needs to be in order for the latter to come to a standstill exactly at the fine position. The deceleration needs to be determined and performed exactly so that the heavy robot comes to a standstill exactly.

In accordance with an added feature of the invention, the robot device is continuously driven without stopping from the starting position to the corrected target position. That is, the robot does not need to stop before reaching the fine position. This results in a time advantage. Fine positions that have already been approached are stored and they can be reached even more quickly.

In accordance with another feature of the invention, the corrected target positions are stored and respective assumed absolute target positions are overwritten with the corrected target positions. The newly overwritten target positions are then used as the assumed absolute target positions for further processing. That is, the system is continuously learning in use.

During the approach to the target position, the system also provides for a plausibility check. If the error is greater than a given threshold, the system triggers a notification for preventive maintenance.

That is, a learning process takes place. The ascertained fine position (i.e., corrected target position) is stored and is retained at least for a certain period. Therefore, the robot can approach the fine position even more quickly.

In accordance with a further feature of the invention, the drive speed of the robot device is decelerated upon approaching the target position and the deceleration is set such that the robot device would come to a stop exactly at the assumed absolute target position. However, once the corrected target position has been acquired, the deceleration schedule is superseded and replaced with a new schedule so that the robot device is driven to the corrected target position and stopped exactly at the corrected target position.

With the above and other objects in view there is also provided, in accordance with the invention, a system for dynamic robot positioning. The system comprising:

a robot device having a drive for autonomous driving and a controller connected to said drive for commanding the drive;

a vision sensor mounted to said robot device and connected for signal transmission to said controller;

an absolute-positioning-sensor configured for determining a coarse position of said robot device relative to a stationary structure, and for transmitting the coarse position to said controller;

a reference marker configured to cooperate with said vision sensor, said reference marker being a visual marker disposed at a defined position within the stationary structure; and the controller is configured to carry out the method steps outline above.

In accordance with yet an added feature of the invention, the absolute-positioning-sensor is a bar code reader or a magnetic stripe reader mounted to said robot device.

In accordance with a preferred embodiment of the invention, the vision sensor is a camera. In the alternative, the vision sensor is a laser distance sensor, a PMD sensor, a time-of-flight distance sensor, a radar sensor, a location-resolving photodiode, an ultrasonic sensor, an inductive position sensor or a capacitive position sensor.

Other features which are considered as characteristic for the invention are set forth in the appended claims.

Although the invention is illustrated and described herein as embodied in a method and system for dynamic robot positioning, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
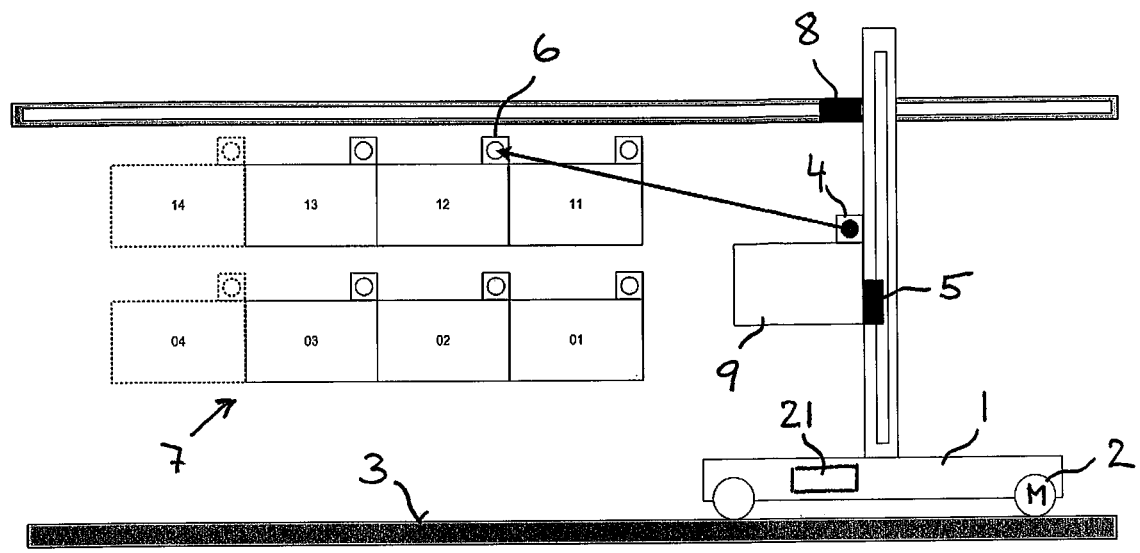
FIG. 1 is a schematic side view of a robot in a distribution and sorting environment according to the invention.

Referring now to the figures of the drawing in detail and first, particularly, to FIG. 1 thereof, there is shown a diagrammatic view of a transport robot 1 in a warehouse environment. The robot 1 in this case is a part of a DBCS machine (DBCS—delivery bar code sorter), which travels on wheels that are driven by one or several motors 2 on a horizontal rail 3, such as an I-beam. The drives are commanded by a machine controller such as a PLC (programmable logic controller) 21 that is illustrated in the base body of the robot 1 and by a controller, which may be referred to as an end effector 9.

The system illustrated here is operable with two main axes, namely, a horizontal X-axis and a vertical X-axis (both parallel to the plane of FIG. 1).

A plurality of shelf compartments or delivery bins 01 . . . 04, 11 . . . 14 are schematically and diagrammatically illustrated on a DBCS wall 7. The exact positions of the bins are marked by sensing patterns 6. In an implementation of the sorting system, the bins may be arranged in 76 columns and 4 lines, thus with 296 bins.

The robot 1 carries a vision sensor 4, such as a camera. Suitable cameras, by way of example, are the Baumer Verisens® XC/XF Series or the Sick Inspector P632. These cameras have a typical accuracy of 0.25 mm, they communicate by way of a TCP/UDP interface, and they operate by way of edge detection or hole detection.

The vision sensor 4 described here is one camera or even a plurality of strategically placed and oriented cameras. It is conceivable for the sensor to comprise, instead of a camera, a laser distance sensor, a PMD sensor (i.e., a time-of-flight distance sensor), a radar sensor, a location-resolving photodiode, an ultrasonic sensor, an inductive position sensor and/or a capacitive position sensor.

The robot 1 also carries two absolute-positioning-sensors 5, one for the X-axis and one for the Y-axis. The robot 1 is commanded by the machine controller 21 which receives input signals from the vision sensor 4 and the absolute-positioning-sensors 5. As will be explained in the following, the machine controller is able to command the DBCS robot 1 to perform an absolute move with the absolute positioning sensors along a barcode or stripe 8 to a corrected position of one sensing pattern at the DBCS wall.

The absolute position sensor 5 may operate on the basis of different concepts. For example, the Leuze BPS 3071 SM 100 D operates with bar codes. The reproducability is ±0.15 mm and the absolute accuracy is ±1 mm/m. The resolution of the sensor is 0.01 mm and it uses an SSI interface. An alternative position sensor is a Balluff BML S1G, which operates with a magnetic strips. The reproducability is ±1 µm, the absolute accuracy is ±20 µm/m. The resolution of the sensor is 0.01 mm and it also uses an SSI interface.

The system described herein is a dynamic, adaptive positioning system, or a learning system. During a learning phase, in a first step, the robot performs an absolute move to a corrected absolute position of one sensing pattern 6 measured by the absolute-positioning-sensors 5. In a second step, a correction move is performed during the absolute positioning, as measured and calculated by way of the relative-positioning-sensor 4.

The exact positions of the DBCS shelf compartments, or pockets, or delivery bins, are "assumed" from a CAD model and then corrected during the adaptive teaching process. The exact and absolute positions of the compartments are marked by the sensing patterns 6. Depending on the vision sensor used, the sensing pattern may be provided for edge detection, for hole detection and/or for pattern detection.

Figure 2:
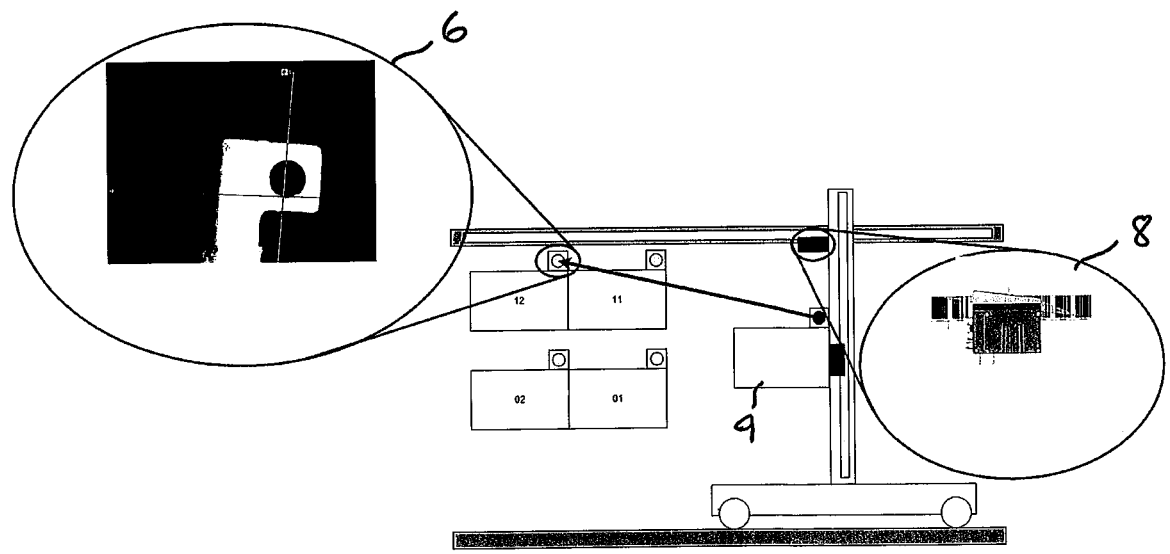
FIG. 2 is a similar view illustrating, in magnified view, a coarse location detection and a fine location detection.

An exemplary such pattern is illustrated in FIG. 2. Here, the two-step learning process is illustrated in steps 1 and 2. The absolute-positioning-sensor 5 commands the system on the basis of the stationary, fixed sensing pattern 8 (e.g., barcode) and the correction, or fine positioning is effected by matching the pattern 6 into the aiming view of the vision sensor 4.

While the machine controllers 21 and 9 are illustrated as being carried by the robot 1, it should be noted that the computer unit for evaluating the sensor data and controlling the robot 1 may be arranged locally on the robot or in decentralized fashion, for example in a central server. In a preferred system, the computer control and machine control will be effected in a distributed, or hybrid control scheme.

The novel system is exceptionally advantageous in that it provides for a learning/teaching process during initial commissioning of the system and also a continuously dynamic adaptability during ongoing use. A teaching process, or machine learning, is illustrated with reference to FIGS. 3 and 3A. These figures also represent the ongoing process. The learning/teaching process may be effected manually and automatically.

For initial commissioning of the system, the absolute positions of the sensing patterns 6 (i.e., of the bins) are retrieved from the CAD model and the robot is manually driven to a first position. This will typically be an end position, such as at bin 01 in FIG. 1.

In the manual process, the first sensing pattern 6 is used for manually commissioning the machine. That is, the vision sensor and the absolute positioning sensors are calibrated and the calibration is stored in the machine controller or the end effector 9. Following the manual process, in which the position of a first bin has been taught, the robot 1 continues with an automatic learning process. In the latter, the position/location of each of the remaining sorting bins or pockets is automatically acquired in sequence.

Figure 3:
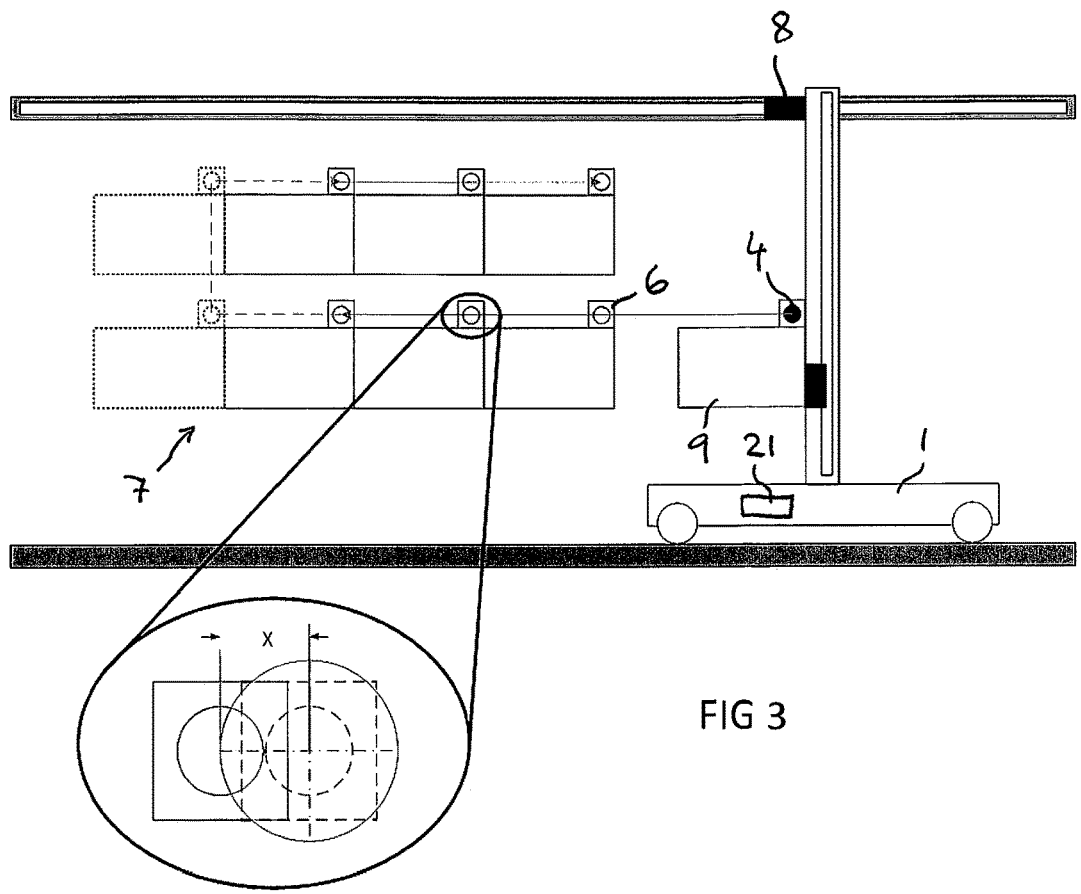
FIG. 3 illustrates a teaching process and also an approach of the robot device toward a target position.
Figure 3A:
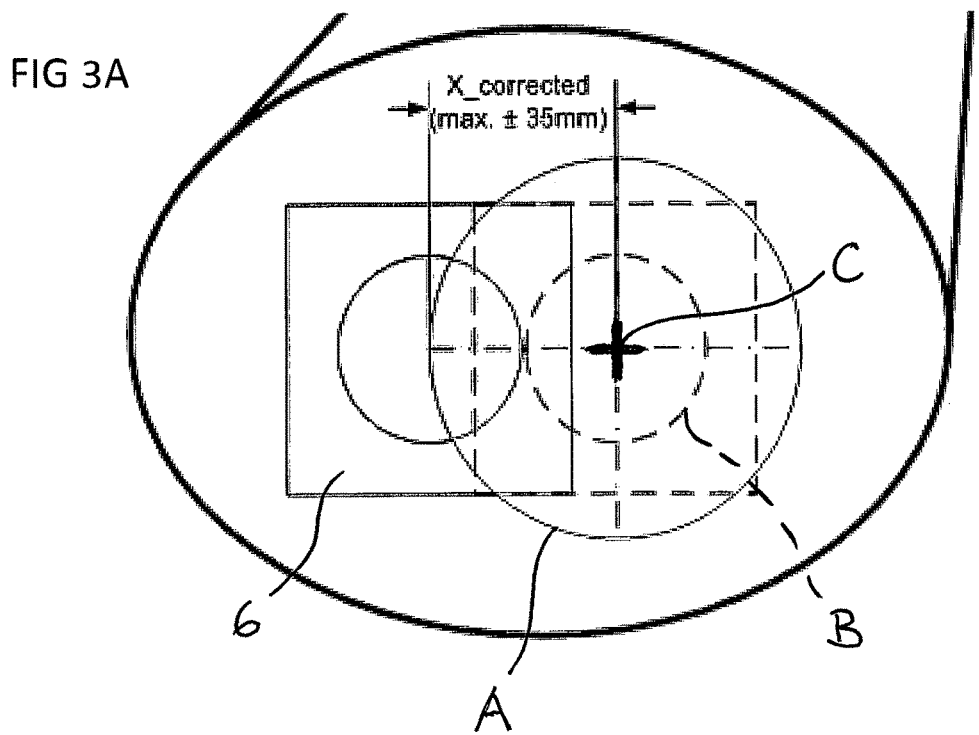
FIG. 3A is a magnified view of the detail in FIG. 3.

The detail of FIG. 3A shows the sensing pattern 6 and, diagrammatically, the approaching vision sensor at the trigger moment. Here, an assumed absolute position B of the sensing pattern has been retrieved from memory. The illustration shows the moment at the beginning of the positioning process. The absolute position in this case is different from the actual position of the sensing pattern by a correction factor X. In this exemplary view, X is shown to have a maximum deviation of ±35 mm because the vision sensor being used has a maximum usable field of vision of 70 mm. A tolerance circle A represents the acceptable tolerance area around the center of the assumed position for the center point of the real sensing pattern (e.g., ±5 mm). The vision sensor is triggered at a trigger point C at the center of the assumed absolute position B of the sensing pattern.

FIGS. 3 and 3A show an offset X only in a horizontal direction. In the case of a pocket wall with 76 columns and 4 lines, the deviations from the nominal positions of the individual pockets will be critical only in the horizontal direction (X-axis). It will be understood, however, that the system is also capable of learning, and adjusting for, deviations in the vertical direction (Y-axis), if so desired.

Figure 4:
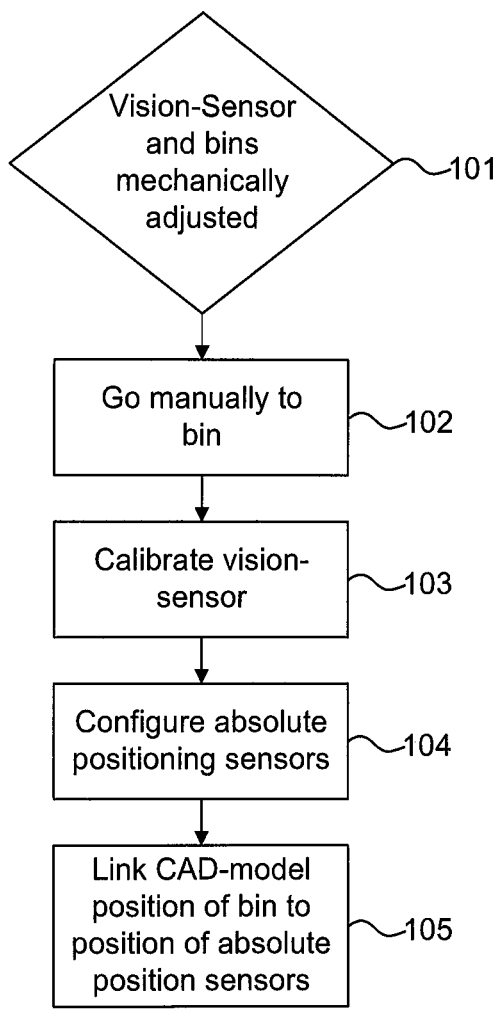
FIG. 4 is a flowchart illustrating a manual teaching method.
Figure 5:
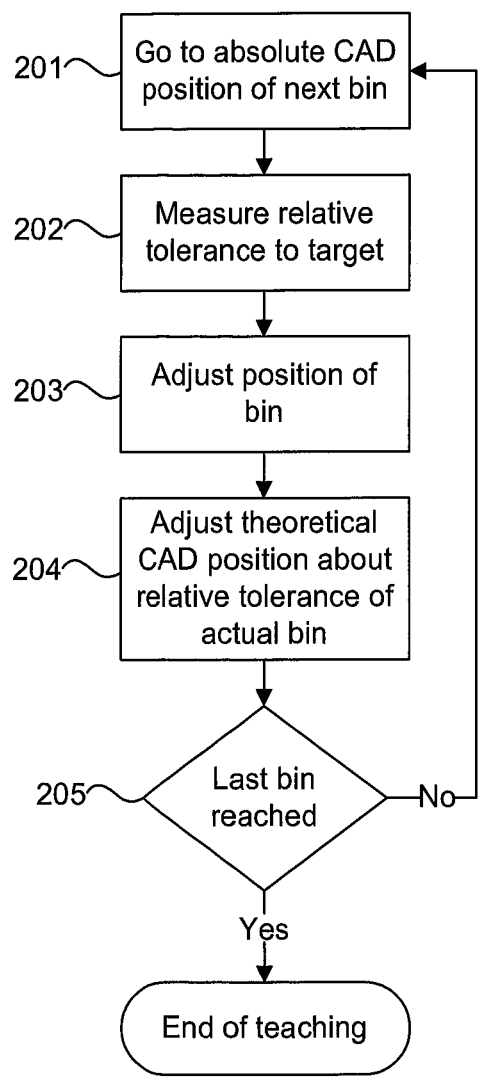
FIG. 5 is a flowchart illustrating an automatic teaching method.

With reference to the flowchart of FIG. 4, which illustrates the manual teaching process, the system first queries in step 101 whether or not the vision sensor and the bins or pockets have been mechanically adjusted. If the answer is no, the system is manually commanded 102 to the first bin. Next the vision sensor 4 is calibrated in step 103 and the absolute-positioning-sensor 5 is configured in step 104. Finally, the CAD-modeled position of bin 1 is linked to the position of the absolute position sensors in step 105.

The automatic teaching process follows the manual process sequentially. The system has already determined the position of the first sensing pattern, i.e., of the first bin. Now the robot moves to the next (adjacent) bin, based on the information from the CAD system. The latter knows the width of the bins and the spacing distance between the bins. The robot 1 stops at the assumed position, which has been input from the CAD model. Next, the position is corrected with the help of the vision sensor by triggering at the assumed (i.e., CAD-modeled) absolute position of the sensing pattern. The input from the vision sensor 4 is evaluated. Finally, an X-tolerance is added to all positions in a moving direction.

With reference to the flowchart of FIG. 4, which illustrates the automatic teaching process, the system first moves to the absolute position determined by the CAD model in step 201. Then the relative distance (i.e., error) X between the modeled position to the actual position, as measured by the vision sensor 4, is determined in step 202. The position of the pocket is adjusted in step 203, and the modeled distance is adjusted by adding/subtracting the distance X in step 204. The system cycles through all of the bins of interest between the query step 205 and the start step 201, until the last bin has been reached.

The correction from the assumed absolute position to the actual position is illustrated by way of example of the magnified detail in FIG. 3. The assumed position from the CAD model is a distance X from the actual position at the time the vision sensor is triggered. The accepted tolerance in the illustrated case is ±35 mm. Once the distance X has been determined, it is added to all of the other positions that are safely immovable relative to the bin that has been evaluated. If the distance X has a negative sign, the addition is, in fact, a subtraction. In either case, we use the term adding and addition herein.

Figure 6:
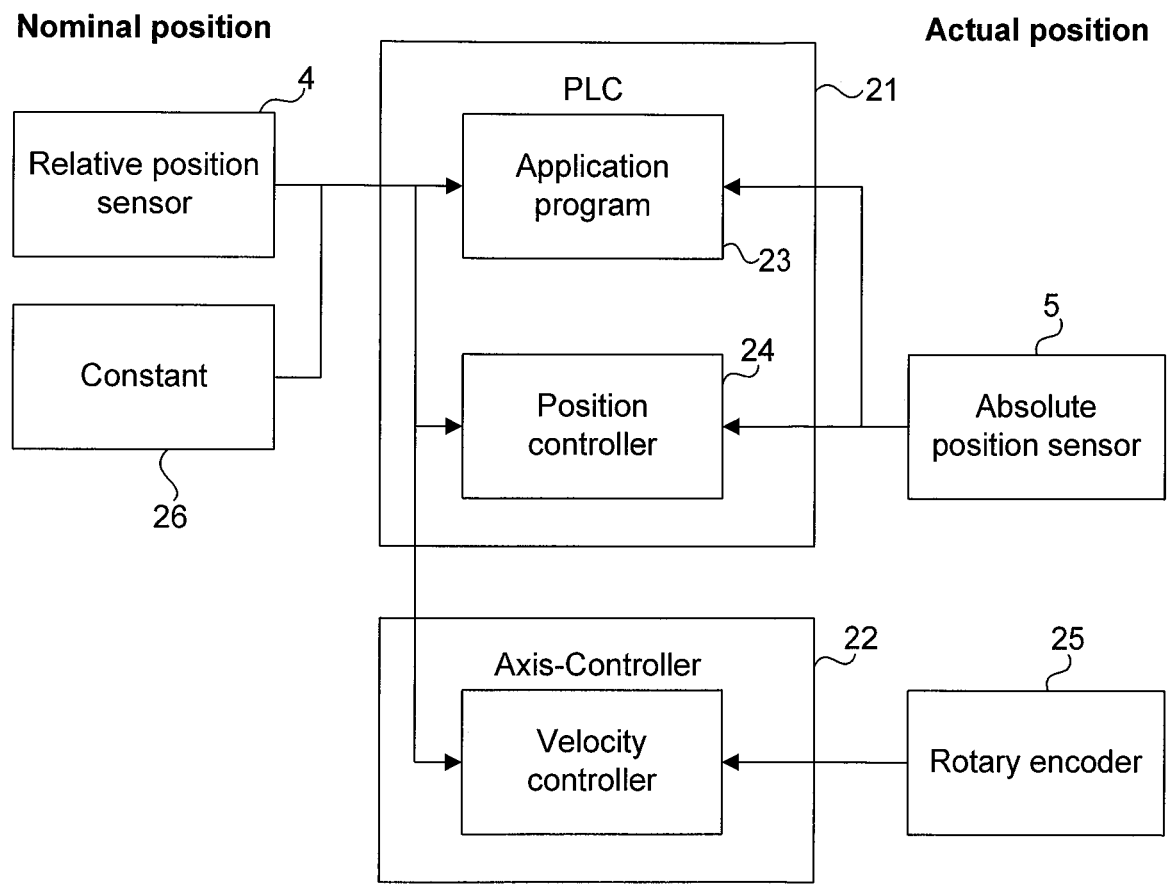
FIG. 6 is a diagram illustrating a control concept using main axes.

The controller structure is illustrated in FIG. 6. The control concept of the system, as illustrated, is split into a PLC 21 (programmable logic controller) and an axis controller 22. The PLC 21 contains two primary elements, namely, the application program 23 and a position controller 24. They receive measurement value input from the absolute-positioning-sensor 5. The axis controller 22 receives input from a rotary encoder 25 that reports the angular position of a drive shaft. The PLC 21 and the axis controller 22 also receive input signals from the vision sensor 4, i.e., the relative position sensor 4, and the constant position information determined by the CAD model 26. That is, the input from the sensor 4 and the model 26 represent the nominal position of the respective bin, while the inputs from the sensor 5 and the rotary encoder 25 represent the actual position of the respective bin.

Figure 7:
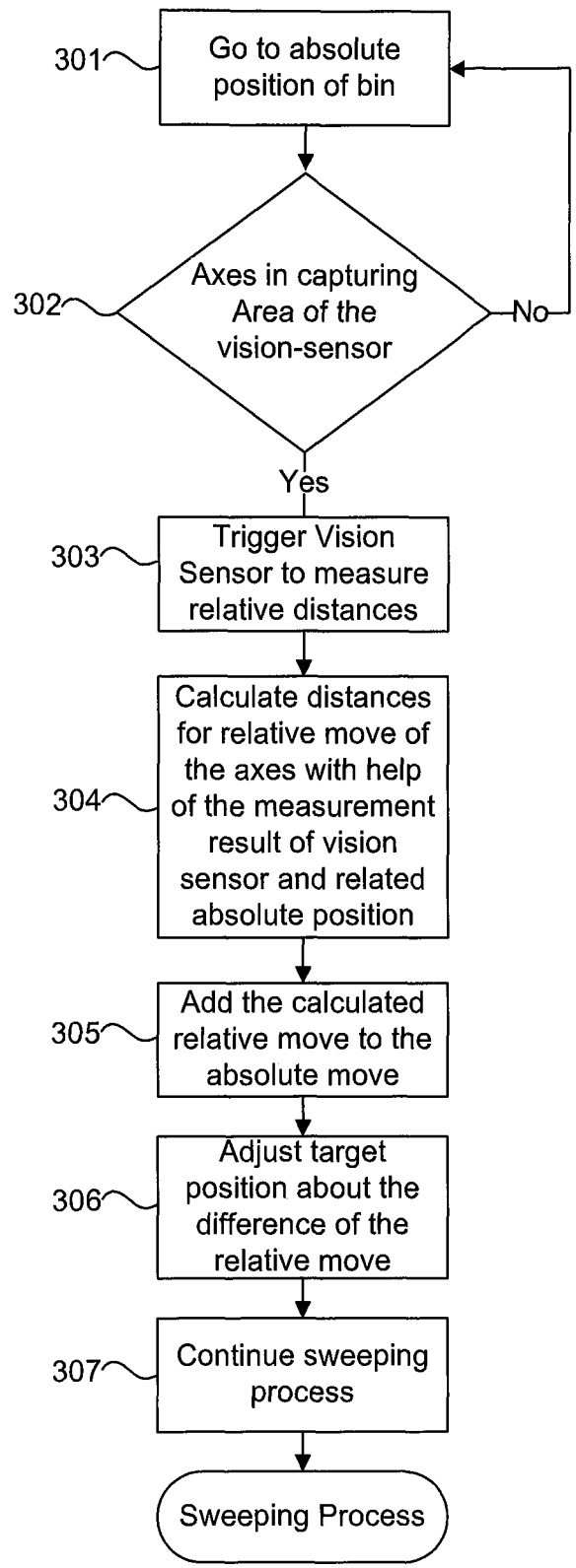
FIG. 7 is a flowchart illustrating a sweeping process.

An exemplary sweeping process is illustrated in the flowchart of FIG. 7. The robot 1 moves to an absolute target position of a bin in step 301. If the axes are in the capturing field of the vision sensor, as queried in step 302, the process moves to step 303 where the vision sensor is triggered. In the alternative, the process cycles back to step 301 to continue the movement. Following the snapshot taken by the vision sensor in order to measure the relative distances in step 303, the distances are calculated for the relative move of the axes with the help of the measurement result of the vision sensor and the related absolute position in step 304. The calculated relative move is added to the absolute move in step 305. Then the target position is adjusted by the difference of the relative move in step 306 and the sweeping process is continued in step 307.

It will be understood that, while the details of the system are described herein with regard to a two-dimensional operating system, the invention is also applicable for three-dimensional systems. In that case, the operational efficiency will benefit from additional sensors, additional movability axes (degrees of freedom) and added control commands.

The following is a summary list of reference numerals and the corresponding structure used in the above description of the invention:

1 Robot, DBCS (delivery bar code sorter)
2 Drive
3 I-beam, floor
4 Vision sensor
5 Position sensor
6 Marking Pattern
7 Shelf, DBCS wall
8 Absolute position pattern
9 Controller, endeffector
21 PLC, programmable logic controller
22 Axis controller
23 Application program
24 Position controller
25 Rotary encoder
26 Stored position information
101-105 Manual teaching process
201-205 Automatic teaching process
301-307 Sweeping process

The invention claimed is:

1. A method of positioning an autonomous robot device relative to a stationary structure, the method comprising:
   driving the robot device from a starting position towards a target position at the stationary structure and thereby using an absolute positioning sensor to continuously monitor a position of the robot device relative to the stationary structure;
   upon determining that an assumed absolute target position has entered a field of view of a vision sensor mounted to the robot device, causing the vision sensor to take an instantaneous image of a visual marker disposed at the target position;
   evaluating the instantaneous image and determining therefrom a deviation of an actual location of the target position from an assumed absolute target position;
   correcting the assumed absolute target position by adding the deviation to the stored target position to define a corrected target position; and
   continuing to drive the robot device to the corrected target position and to stop the robot device at the corrected target position.

2. The method according to claim 1, which comprises continuously driving the robot device without interruption from the starting position to the corrected target position.

3. The method according to claim 1, wherein the robot device forms a part of a delivery bar code sorter (DBCS) machine and the target position is a sorting bin in a sorting installation.

4. The method according to claim 1, which comprises storing corrected target positions and overwriting respective assumed absolute target positions with the corrected target positions and using the overwritten respective assumed absolute target positions for further processing.

5. The method according to claim 1, which comprises slowing a drive speed of the robot device upon approaching the target position and setting a deceleration such that the robot device would come to a stop exactly at the assumed absolute target position until the corrected target position has been acquired, whereupon, without stopping at the assumed absolute target position, the robot device is driven to the corrected target position and stopped at the corrected target position.

6. The method according to claim 1, which comprises, prior to a first use of the robot device, carrying out a teaching sequence by:
   manually driving the robot device to a first target position at the stationary structure and causing the robot device to memorize an exact location of the first target position with reference to at least two main axes; and
   subsequently causing the robot device to automatically progress to a next target position and determining and memorizing an exact location of the next target position; and
   repeatedly causing the robot device to automatically progress to a further target position until an exact location of a last target position has been determined.

7. The method according to claim 1, which comprises performing a plausibility check by comparing the corrected target position with the assumed target position and, when a difference exceeds a given threshold, issuing a warning.

8. The method according to claim 7, which comprises, when the difference exceeds the given threshold, triggering a preventive maintenance process.

9. A system for dynamic robot positioning, the system comprising:
   a robot device having a drive for autonomous driving and a controller connected to said drive for commanding the drive;
   a vision sensor mounted to said robot device and connected for signal transmission to said controller;
   an absolute-positioning-sensor configured for determining a coarse position of said robot device relative to a stationary structure, and for transmitting the coarse position to said controller;
   a reference marker configured to cooperate with said vision sensor, said reference marker being a visual marker disposed at a defined position within the stationary structure;
   wherein said controller is configured:
   to drive said robot device from a starting position towards said defined position and to continuously monitor a position of said robot device relative to the stationary structure;
   upon determining that the target position has entered a field of view of said vision sensor, to cause the vision sensor to take an instantaneous image of said visual marker;
   to evaluate the instantaneous image and to determine therefrom a deviation of an actual location of the target position from a stored target position;
   to correct the stored target position by adding the deviation to the stored target position for defining a corrected target position; and
   continuing to drive the robot device to the corrected target position and to stop the robot device at the corrected target position.

10. The system according to claim 9, wherein said absolute-positioning-sensor is a bar code reader or a magnetic stripe reader mounted to said robot device.

11. The system according to claim 9, wherein said vision sensor is a camera.

12. The system according to claim 9, wherein said vision sensor is a device selected from the group consisting of a laser distance sensor, a photonic mixer device (PMD) sensor, a time-of-flight distance sensor, a radar sensor, a location-resolving photodiode, an ultrasonic sensor, an inductive position sensor and a capacitive position sensor.

* * * * *